United States Patent [19]

Hirosuke

[11] 4,444,248

[45] Apr. 24, 1984

[54] APPARATUS FOR COOLING OR HEATING ARTICLES CARRIED ON A SPIRAL CONVEYOR

[76] Inventor: Onodera Hirosuke, 306, 3-chome, Imazunaka, Tsurumi-ku Osaka, Japan

[21] Appl. No.: 332,542

[22] Filed: Dec. 21, 1981

[30] Foreign Application Priority Data

Mar. 16, 1981 [JP] Japan ................................. 56-38271

[51] Int. Cl.³ ........................... F28F 5/02; F24H 9/06
[52] U.S. Cl. .................................... 165/120; 432/121; 34/137
[58] Field of Search ............................... 165/120–122; 198/812; 432/144, 145, 121; 34/137

[56] References Cited

U.S. PATENT DOCUMENTS

| | | | |
|---|---|---|---|
| 2,677,336 | 5/1954 | Spooner | 432/145 |
| 2,688,808 | 10/1951 | Ipsen | 165/108 |
| 3,393,728 | 7/1968 | Davis | 165/122 |
| 4,118,181 | 10/1978 | Onodera | 432/121 |
| 4,260,053 | 4/1981 | Onodera | 198/812 |

FOREIGN PATENT DOCUMENTS 535674 1/1922 France ................................. 165/120

*Primary Examiner*—William R. Cline
*Assistant Examiner*—Dan Costello
*Attorney, Agent, or Firm*—George B. Oujevolk

[57] ABSTRACT

Apparatus for cooling or heating articles carried on a spiral conveyor helically rotating round the outer periphery of a drum, wherein the diameter of the drum is reduced, a blower port and a suction port being provided on the peripheral wall encircling the spiral conveyor, said blower port and suction port being adapted to communicate with each other with interposition of a heat exchanger and fans, air cooled or heated in the heat exchanger being blown through the blower port, the air being spontaneously bifurcated to both sides of the small diameter drum to be recombined at the suction port, the recombined air being cooled or heated in the heat exchanger for circulation through the blower port so that the drum is cooled or heated speedily and efficiently through the whole periphery thereof, thereby enabling not only to economize the cost and time required for cooling or heating but also to minimize the dimensions of the whole apparatus for the reduction of the space necessitated for the installation.

1 Claim, 6 Drawing Figures

APPARATUS FOR COOLING OR HEATING ARTICLES CARRIED ON A SPIRAL CONVEYOR

The invention relates to an apparatus for cooling or heating articles carried on a spiral conveyor adapted to helically rotate round the outer periphery of a drum.

With the conventional spiral conveyor, the diameter of the drum and the width of the belt were in the ratio of 1:4–5 since the minimum bending radius of the conveyor belt was large. Thus the conventional spiral conveyor had a disadvantage in that the large diameter of the drum resulted in great expansion of the size of the whole apparatus. It had a further disadvantage in that the elongated course of rotation of the conveyor belt necessitated a large amount of cooled air or heated air for the uniform cooling or heating of the whole peripheral surface of the drum, the cooling or heating efficiency being deteriorated as a result.

Thus it was necessary to reduce the diameter of the drum for the elimination of the above-described disadvantages. However, it was technically difficult to reduce the diameter of the drum under the restriction of the bending radius of the belt.

The inventor concerned has succeeded in reducing the ratio of the drum diameter and the belt width to 1:1.5–2 by the use of a newly developed conveyor having a reduced bending radius. Thus the conveying space in which the belt helically rotates has also been reduced.

The invention has for an object to provide a cooling or heating apparatus with greater speed and higher efficiency by the use of a spiral conveyor having a reduced diameter as described hereinabove, and is characterized in that cooled or heated air blown through a blower port to the peripheral wall encircling the outer periphery of the spiral conveyor is spontaneously bifurcated to both sides of the drum due to smallness of its diameter, the bifurcated air being recombined through a suction port provided on the opposite side of the blower port, the air being re-cooled or re-heated for circulation through the blower port.

When the articles carried on the conveyor are to be cooled, cooled air blown into the conveying space through the blower port is spontaneously bifurcated to both sides of the drum due to smallness of the diameter thereof thereby enabling to cool the whole of the conveying space round the outer periphery of the drum with particularly high efficiency.

The bifurcated air is recombined through the suction port and re-cooled for circulation through the blower port. Since the cooled air flows in the form of a circulation route, its flow is systematic with the least thermal loss. The conveying space is reduced by the reduction of the drum diameter, thereby enabling to cool the articles carried on the conveyor quickly and economically with a relatively small amount of cooled air.

An embodiment according to the invention for cooling articles carried on the spiral conveyor will hereinunder be described in detail in reference to the accompanying drawings.

Figure 1:
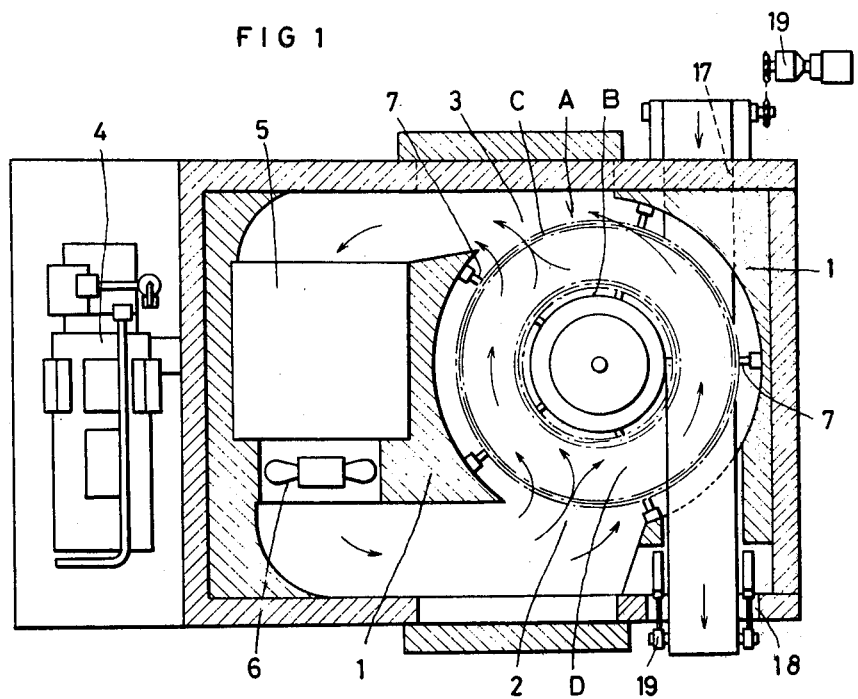
FIG. 1 is a cross-sectional plan view of the apparatus.
Figure 2:
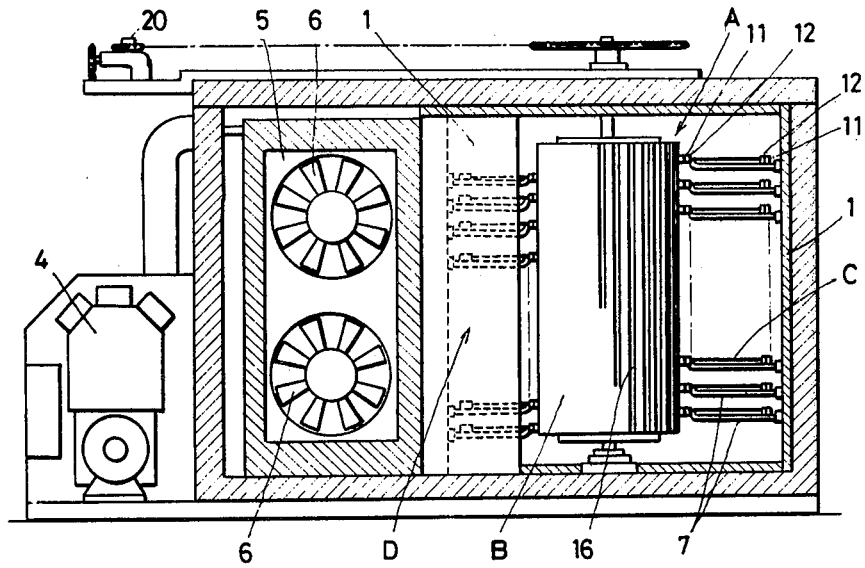
FIG. 2 is a longitudinal sectional elevation of the same.
Figure 3:
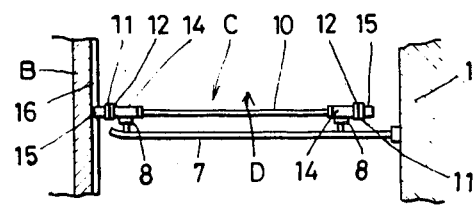
FIG. 3 is a fragmentary elevational view, on a magnified scale, of the conveying space.

Referring to FIGS. 1 to 3, (A) designates a spiral conveyor, (B) designating a drum, (C) designating a conveyor belt. The apparatus is adapted to convey articles on the conveyor belt (C) from the lower end side to the upper end side of the drum (B) and vice versa by driving said belt (C) helically round the outer periphery of the drum (B). Fundamentally, the construction is commonly known.

The diameter of the drum (B) is restricted by the bending property of the conveyor belt (C).

According to the invention, the ratio of the drum diameter to the belt width can be reduced to 1:1.5–2 by use of such conveyor belt as will be described hereinafter. The outer periphery of the spiral conveyor (A) in which a drum of such reduced diameter is used is encircled by heat insulating peripheral wall 1, conveying space (D) for the movement of the conveyor belt (C) being formed between said peripheral wall 1 and the outer periphery of the drum (B), a blower port 2 and a suction port 3 extending longitudinally over the whole length of the drum (B) being formed on one side and the opposite side of the peripheral wall 1, respectively.

The blower port 2 and the suction port 3 are adapted to communicate with each other with interposition of a heat exchanger 5 cooled by a cooler 4 and fans 6, a circulation route being formed by the fans 6, blower port 2, conveying space (D), suction port 3 and heat exchanger 5.

As shown in FIG. 3, spiral rails 8,8 are supported by a suitable number of arms 7 secured to the inner face of the peripheral wall 1, the belt conveyor (C) being driven while being supported on said rails.

Figure 4:
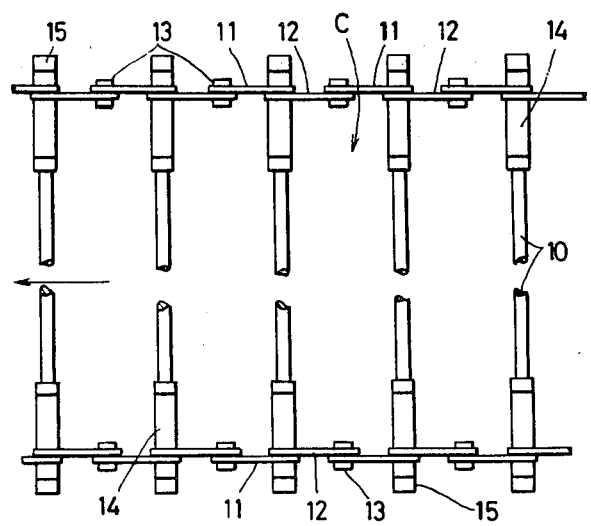
FIG. 4 is a fragmentary plan view of a belt conveyor perferable for the embodiment of the invention.
Figure 5:
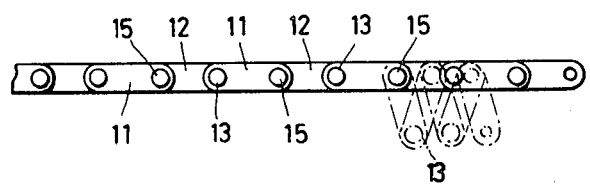
FIG. 5 is an elevational view of FIG. 4.
Figure 6:
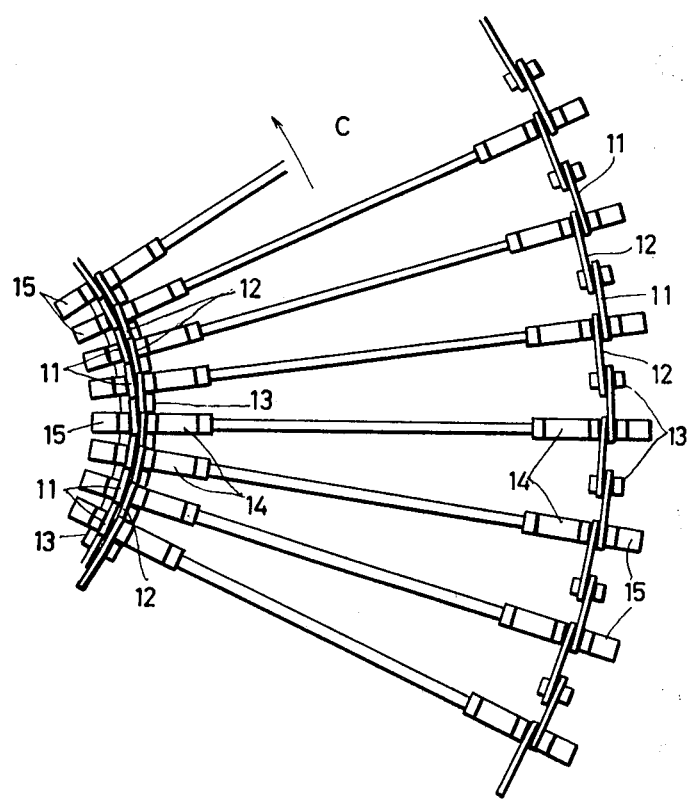
FIG. 6 is a fragmentary plan view in which the conveyor belt of FIGS. 4 and 5 is used for a spiral conveyor.

FIGS. 4 to 6 show a conveyor belt preferred by the invention. This conveyor belt invented by the inventor concerned was patented under U.S. Pat. No. 4,260,053, wherein a pair of links 11,21 at one end thereof are rotatably pivoted on both ends of regularly spaced transverse shafts 10,10 ... respectively, the link 11 being flexibly coupled with the link 12 of the preceding transverse shaft 10, while the other link 12 with the link 11 of the succeeding transverse shaft 10, by a coupling axis 13 respectively, the links 11,12 on both ends of the transverse shaft 10 being permitted to bend between the adjacent transverse shafts 10,10.

A roller 14 is externally fitted on the outside of the links 11, 12 of each transverse shaft 10, a projection 15 being provided on the outside thereof.

The aforedescribed conveyor belt (C) is helically wound round the drum (B) with the rollers 14 mounted on the spiral rails 8 and the projection 15 fitted into a longitudinal recessed groove 16 provided on the outer periphery of the drum (B).

On the peripheral wall 1 there are provided an inlet 17 and an outlet 18, the conveyor belt (C) being guided into the conveyor space (D) through the inlet 17 to be driven by a belt drive means 19 provided in a suitable location and a drum drive means 20 synchronizable with the driving speed of said belt (C), said belt (C) being guided to the outside through the outlet 18. The belt (C) is again guided into the conveying space (D) through the inlet 17 thereby completing a circulation.

Thus, when the belt (C) rotates round the outer periphery of the drum (B), the links 11,12 on the side of the inner periphery of the belt (C) are permitted to bend freely by virtue of the coupling axis 13 disposed between the transverse shafts 10,10. The belt of such high flexibility enables to largely reduce the diameter of the drum (B) compared with the case of the conventional drum. The belt (C) rotates on the spiral rails 8 with the projection 15 moving vertically in the recessed groove 16 of the drum (B), thereby enabling the drum (B) to be driven smoothly even when its diameter is small.

According to the embodiment, the air cooled in the heat exchanger 5 is blown by the fans 6 into the conveying space (D) through the blower port 2, the air being spontaneously bifurcated to both sides of the small diameter drum in collision therewith, recombined at the suction port 3 on the opposite side, re-cooled in the heat exchanger 5, and returned to the blower port 2 for circulation. Since the thermal loss is very small, while the whole of the conveying space (D) round the outer periphery of the drum (B) is uniformly cooled, the invention has an advantage in that not only the cooling effect is greatly improved but also the required coolness is obtainable in a very short space of time.

The invention has a further advantage in that speedy and efficient cooling enables to economize the cost required for cooling, while the minimized apparatus enables to reduce the space required for the installation.

It will be easy to understand that the embodiment is usable also as an apparatus for heating the articles carried on the spiral conveyor by substituting the freezer 4 with a heater. The conveyor belt (C) may be replaced by a belt of other construction having such high flexibility as will enable to reduce the diameter of the drum (B).

What is claimed is:

1. An apparatus for cooling or heating articles carried on a spiral conveyor adapted to helically rotate around the outer periphery of a small diameter drum with an outer periphery, comprising in combination:
   (a) a heat insulated peripheral wall (1) around at least a portion of said spiral conveyor;
   (b) a recessed groove (16) in said drum outer periphery; (c) a blower port (2) and a suction port (3) defined on opposite sides of said peripheral wall (1), a conveying space (D), defined around said drum, fan means (6) and heat exchanger means (5) for communication between said blower and suction ports (2, 3);
   (d) a conveyor belt (C) having juxtaposed transverse shafts (15) with a pair of links (11, 12) rotatably pivoted on both sides thereof, disposed for moving in said defined conveying space (D), one link being flexibly coupled with the link of the preceeding transverse shaft, the other link being flexibly coupled with the link of the succeeding transverse shaft, spiral rails (8), roller means (14) externally fitted on the outside of said links (11, 12), mounted on said rails (8), outward projection means (15) on said conveyor belt extending into said groove (16).

* * * * *